Aug. 5, 1969 M. S HUNT ETAL 3,459,952
ROTATING DRUM SCANNER HAVING SCANNING BLOCKS ON SURFACE
Filed June 21, 1967 4 Sheets-Sheet 1

INVENTORS
MAHLON S. HUNT
MICHAEL G. TAVENNER
THEODORE E. WIRTANEN
ROBERT L. ILIFF
BY
Harry A. Herbert Jr.
and
Arsen Tashjian
ATTORNEYS INVENTORS
MAHLON S. HUNT
MICHAEL S. TAVLARIDES
THEODORE E. VIRTANEN
ROBERT L. ILIFF
BY Harry A. Herbert Jr
and Arden Tashjian
ATTORNEYS

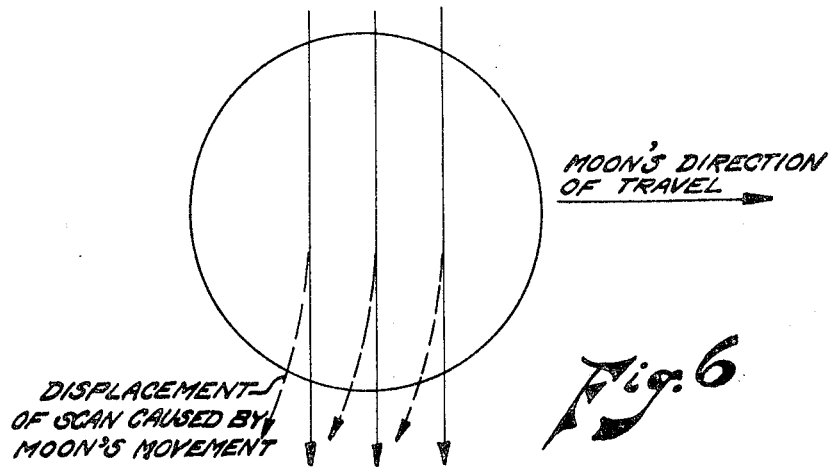
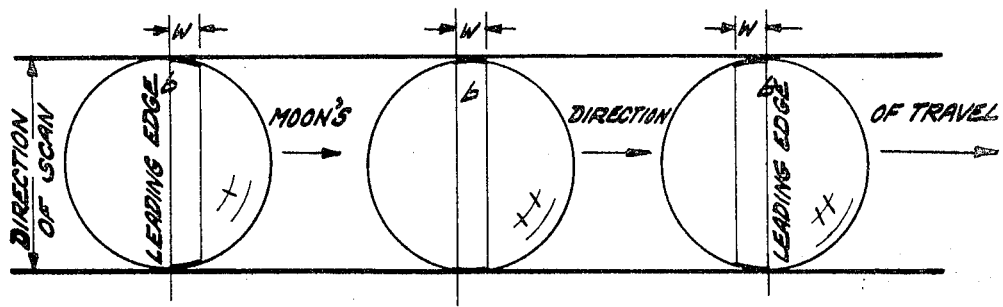
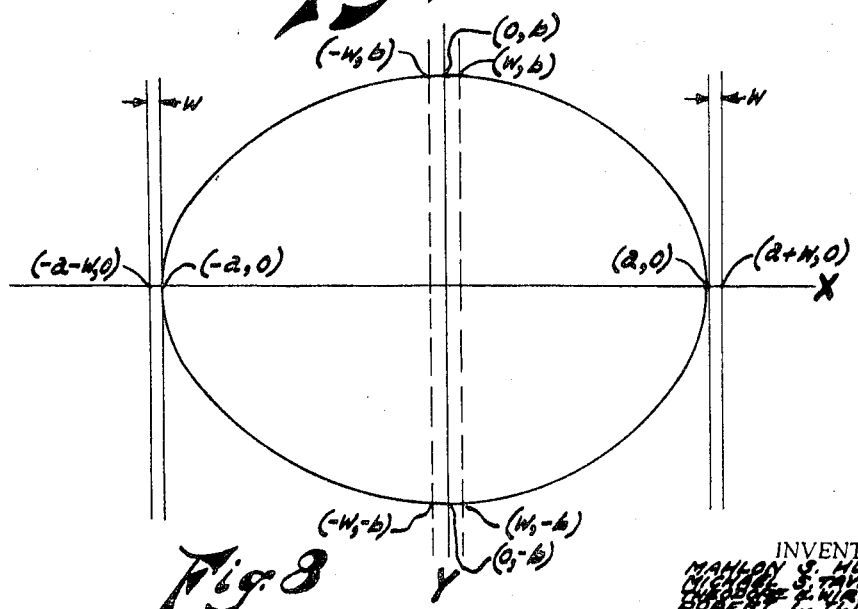

United States Patent Office 3,459,952
Patented Aug. 5, 1969

3,459,952
ROTATING DRUM SCANNER HAVING SCANNING BLOCKS ON SURFACE
Mahlon S. Hunt, Framingham, Michael S. Tavenner and Theodore E. Wirtanen, Chelmsford, and Robert L. Iliff, Canton, Mass., assignors to the United States of America as represented by the Secretary of the Air Force
Filed June 21, 1967, Ser. No. 648,540
Int. Cl. H01j 39/12
U.S. Cl. 250—236                3 Claims

ABSTRACT OF THE DISCLOSURE

A scanning device including a constant speed rotating drum having a plurality of aiming blocks attached to the outer surface thereof with longitudinally coplanar openings therein for receiving light from an image and mirrors for reflecting the image toward corresponding fixed photosensors within the rotating drum, each photosensor producing a signal to indicate when the image is in optical alignment with the openings and auxiliary equipment to supply power to the photosensors and to amplify and record the signals from each channel.

---

The invention described herein may be manufactured and used by or for the United States Government for governmental purposes without payment to us of any royalty thereon.

This invention relates to a photoelectric scanning device which operates by describing a series of parallel lines across the image of the event being observed. More particularly, the invention is concerned with providing a novel means for scanning a field of view by multiple arrays of precisely aimed and timed photosensors to produce a large number of parallel traces in one direction of a heavenly body such as the lunar disc as it transits the field of view of the scanner.

Selenodesy, that portion of geodesy concerned with the size, shape, and mass distribution of the moon, is constrained by the requirement that the etarly selenodetic techniques cannot involve occupation of the lunar surface. Thus, it is necessary to provide a remote sensing technique which possesses unique advantages in repeatability, accuracy and data evaluation.

One of the current problems in selenodesy is the accurate definition of the lunar profile; that is, how closely this profile approaches a circle. One approach to this problem is to collect a large number of parallel traces of the lunar profile, or lunar disc, measured as the moon transits the reticle of a reference device. This data, collectively, would describe a planimetric graph of the lunar disc. Careful measurement of the relative lengths and positions of these traces would permit an appraisal of the apparent agreement or diversion of the figure from a circle.

An obvious way this could be done is by maintaining a moving picture record of the lunar disc as it transits a reference reticle within the camera's field of view. While the photographic record thus obtained might have commendable resolution, the random instability of photographic film would significantly degrade the data collected by such a technique for prescision measurements. Thus, it is necessary to look for other methods of sampling images of the lunar disc as it crosses a given reference line or area.

The present invention discloses a technique for making photoelectric observations of the moon using narrow beamwidth photosensors. The beamwidth ot field of view of the photosensors is governed by fiber optics and aiming holes, drilled into blocks fastened symmetrically to the outside of a slowly rotating drum. Each block so constructed contains as many aiming holes as there are photosensors available to receive the images. The corresponding holes in successive blocks permit an image to be projected on the respective photosnsfor channels. By means of mirrors or by direct projection, successive images from each block are projected down inside the drum into the photosensors which are mounted on a non-rotating rack extending into one end of the drum. The drum, motor, and photosensor rack are light enough in weight to be accommodated on a sidereal drive mount, if desired. The mounting arbor for the entire unit is designed to permit use of the device in any mode from horizontal to vertical with respect to the direction of travel of the object being scanned.

Accordingly, it is an object of the present invention to provide means for determining the shape, size, and mass distribution of a remotely positioned body, such as the moon from a location on the earth.

Another object of the invention is to provide a rotating drum scanner for collecting a larger number of parallel traces of the lunar disc as it transits the instrument to determine the diversion of the figure from a circle and the true outline of the moon's shape.

Still another object of the invention would be to make photoelectric observations of the moon using narrow-beam photosensors to obtain a signal which, when coupled with precise timing, produces a repeated trace of the moon transiting several close, parallel reference lines. The timing record enables an accurate evaluation of the variance encountered becuse of the moon's movement across the field of view.

A further object of the invention is to provide a multiple channel scanning device wherein the several channels operate simultaneously in order to produce a record showing the relative positions of the start and end points of the rise times at each of the channels. By comparing the traces of adjoining channels. the actual deviation of the record from the ideal figure can be determined.

A still further object of the invention is to provide a rotating drum scanner having aiming blocks attached to its outer surface with aiming holes which scan in a series of lines vertically, obliquely or horizontally across which or along which the moon's image will pass. The data thus received includes a series of recorder time intervals which vary in length with the duration of the observed event.

These and other objects, features and advantages will become more apparent after considering the following detailed description taken in conjunction with the annexed drawings and appended claims.

In the drawings wherein like reference characters refer to like parts in the several views:

FIGURE 6 is a view showing the variance encountered when tracking normal to the moon's movement causing the path to shift from a straight line;

FIGURE 7 is a diagrammatic view of the moon image showing the flattening effect as the axis crosses the field of view of the scanning channel; and FIGURE 8 is a view of the plotted shape of the scanned object which is substantially circular producing an ellipse truncated at the poles of the minor axis.

Figure 1:
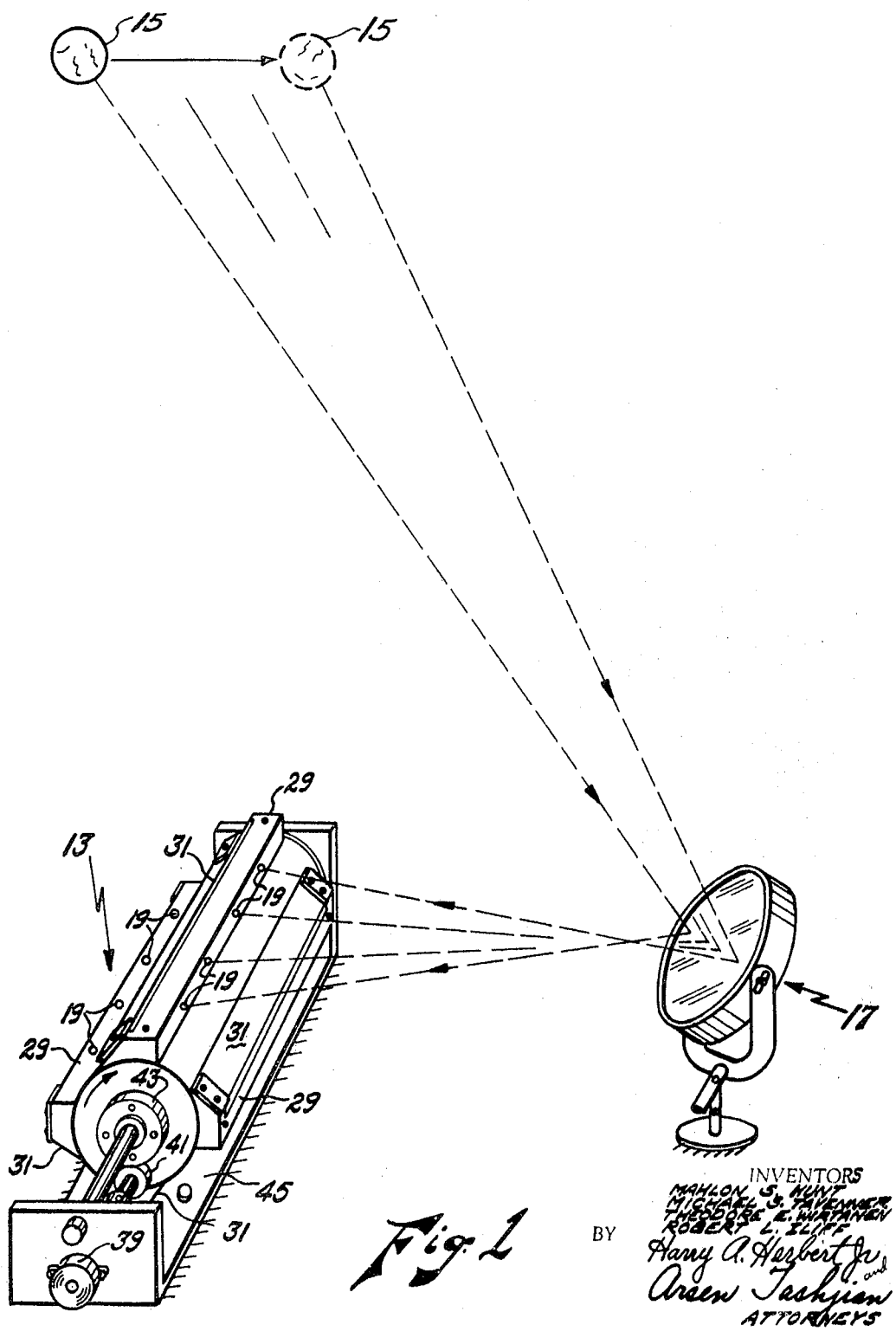
FIGURE 1 is a general view of a rotating drum scanner according to the invention in operation.

Referring now to the figures, there is shown a drum scanner generally designated by the character 13 which is positioned to receive an image of the moon 15 reflected from the mirror 17. As shown in FIGURE 1, the moon 15 moves across the sky producing a corresponding angular deviation of the image reflected by the mirror 17 which passes through the aiming holes 19 on the drum scanner 13.

Figure 2:
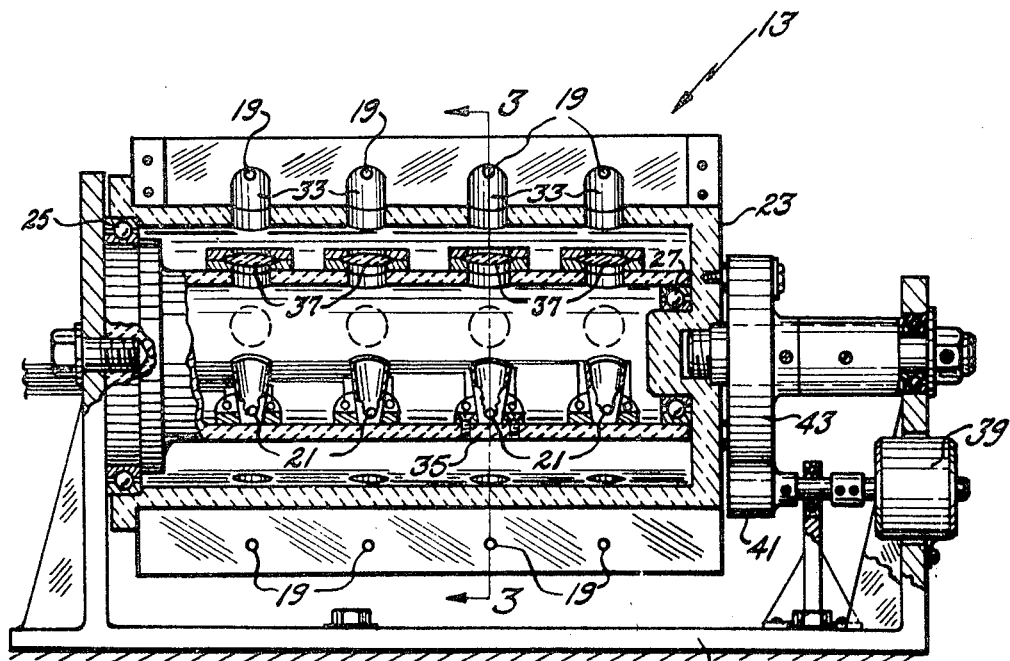
FIGURE 2 is a rear elevation view of the rotating drum scanner partly in section along a line corresponding to the image path.
Figure 3:
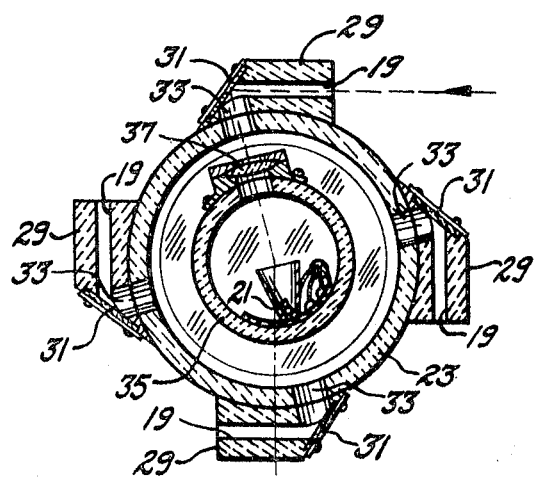
FIGURE 3 is a cross sectional view taken along the line 3—3 of FIGURE 2.

The detailed view in cross section of the scanning device shown in FIGURE 2 is designed to provide photoelectric scanning at constant preselected speeds by multiple arrays of precisely aimed photosensors 21. The aiming holes 19 of the device are so positioned that they will describe a series of parallel lines in one direction across the image of the event being observed.

A revolving drum 23 is an essential element of the drum scanner and is mounted to rotate on the bearings 25 and 27. The drum 23 includes a series of four aiming blocks 29 each containing four precisely aligned aiming holes 19 which are longitudinally coplanar. The blocks 29 are shaped to allow for the attachment of a flat mirror 31 across the back of the aiming holes 19 to divert the image 90 degrees downward through openings 33 in the revolving drum 23. The image is thereby projected onto a fixed instrument mount 35 upon which are mounted the photosensors 21. The small lenses 37 can be installed on the instrument mount 35 to gain better resolution of the scan.

The drive arrangement for rotating the drum 23 includes a drive motor 39 having a rubber friction drive wheel 41 in contact with the disc 43 attached to the rotating drum 23. The motor 39 is provided with means for adjusting speed for rotation in a range of 50 to 150 r.p.m. The scanner 13 is mounted on the base 45 which serves to rigidly support the instrument for both vertical and horizontal operation. Also, the base 45 is suitable for attachment on a telescope-type sidereal drive mount. Auxiliary equipment, not part of the device, is required to supply power for phototubes, amplifier and recorder to operate the drum scanner.

Figure 4:
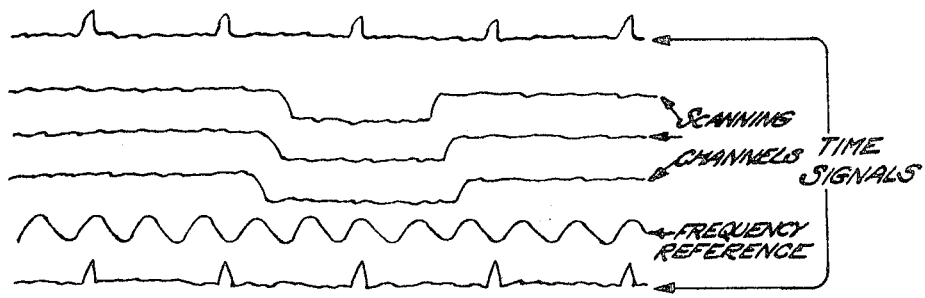
FIGURE 4 is a view showing an example of the oscillograph data obtained as the moon transits one of the aiming holes.
Figure 5:
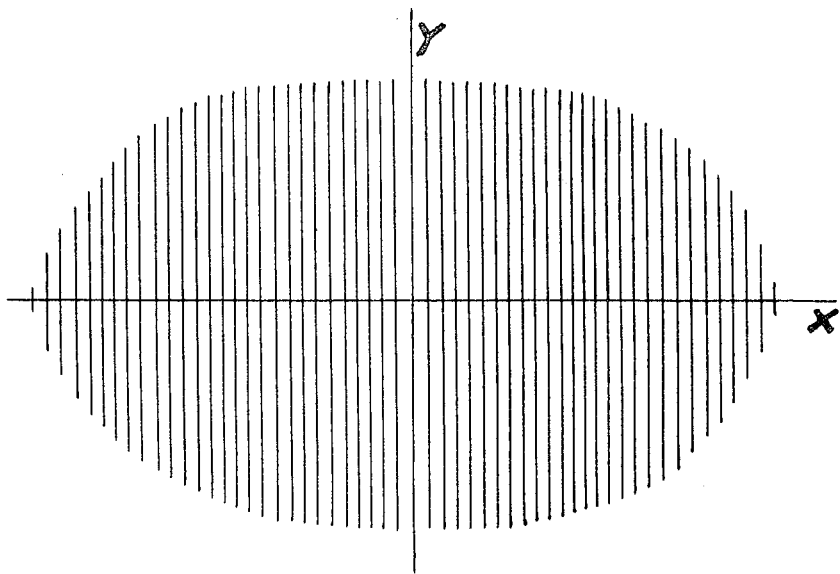
FIGURE 5 is the graphic record as plotted of the data received from the complete transit of the moon through one channel.

In operation, the aiming holes 19 of the rotating drum scanner 13 scan in a series of lines vertically, horizontally or obliquely across which or along which the moon's image will pass. The recording of this passage across successive photosensor tracks, coupled with precise timing, produces many traces of the moon transiting several close, parallel reference lines. Data shown in FIGURE 4 consists of a series of oscillograph records of time intervals varying in length with the duration of the observed event. The pictured data is a typical record of a signal received from a drum scanner having three aiming holes through which the reflected moon image enters the aiming block and is diverted downward to impinge on the photosensor. A preliminary sampling of the data might consist of taking all of information from one channel and plotting it graphically which will produce the graph shown in FIGURE 5.

The timing record is used to obtain an accurate evaluation of the variance encountered when the scanner is tracking normal to the moon's movement across the sky. As the photosensors track down the disc of the moon, the moon's movement across the field of view causes this path of the point of tracking to be shifted from a straight line. The graphic representation of this phenomenon is shown in FIGURE 6.

In FIGURE 7 there is depicted the flattening effect as the axis of the scanned object crosses the field of view of the scanning channel. It can be seen that there is an area at the center of the plotted image equal to $2w$ (shown in FIGURE 8) where the length $b$ does not change. This is caused by the finite widths of the scanner's beamwidth. At the instant the leading edge of the scan senses the maximum length of $b$, this is recorded on the oscillograph trace. This condition maintains until the image being scanned passes beyond the view of the trailing edge of the scan.

Each interval is plotted as a straight line representing the total time of occurrence. This line is, for convenience, plotted parallel to the Y-axis of the graph, with the X-axis serving as the mid-point in time of each plot. Having plotted all the intervals on a graph, it is now possible to construct a curve connecting the ends of all these lines. If the observed object had a circular image and had foreground lighting, the plotted shape should approximate an ellipse "truncated" at the poles of the minor axis. For example, as shown in FIGURE 8, let:

$a$=values along X or major axis
$b$=values along Y or minor axis
$w$=width of individual scan (in same units as $a$, $b$)

It can be seen that from a point $(a+w, o)$ on the X axis, there will be some light recorded. This means that the record of the image will begin $w$ units before reaching the extremity of the major axis. This is a result of the fact that $w$ has some finite width, and at that moment when the leading edge of the scanning opening allows passage of enough light to register on the photosensor the recording will begin. This immediacy of beginning of the image recording is further confounded with diffraction of the light as it passes through the scanner openings. However, scanning speed and scanning beamwidth will minimize diffraction effects on the resolution of the scanned image. Therefore, from the point $(a+w, o)$ the image will approximate an ellipse $$\frac{x^2}{a^2}+\frac{y^2}{b^2}=1$$

up to the points $(a=w, b)$ and $(a=w, -b)$. From $(a=w$ through $a=o$ to $a=-w)$ $b$ will be at maximum and remain constant. Then, from the points $(a=-w, b)$ and $(a=-w, -b)$ to $(-a-w, o)$ the plotted image again takes on the characteristics of the ellipse $$\frac{x^2}{a^2}+\frac{y^2}{b^2}=1$$

A helpful feature here is the fact that the dimensions of $w$ need not be known beforehand, but can be determined with precise, multiple scans all plotted at the proper time interval along the $x$ axis.

A further examination of this plotted image is made by evaluating the rate of change of the lengths of the plotted intervals. When evaluated against the central angle formed by the $x$ axis and a line through the end of each line plotted, $x$ values will vary in proportion by $y$ values in the relationship $$x^2=h^2-y^2$$

where $h$=the hypotenuse or radius vector from the origin of the graph and which, with the $x$ axis, forms the central angle. As the $x$ axis of the graph represents the total population of the data, the data lines can be spaced in such a manner that the decrease or increase in $x$ is constant, thereby permitting minute changes in $y$ to be reflected in irregularities in the calculation of $h$ and from this, the determination of degree of circularity of the lunar profile. It should be noted that the data from one channel, plotted as suggested above in FIGURE 8, does not give a complete picture inasmuch as the scan has been plotted arbitrarily by aligning all the time interval midpoints in a straight line. Undulations in the image, if they occur, are thus "halved"; that is, they are not placed in their true relationships to the adjoining intervals.

At this point the importance of having several scanning channels operating simultaneously becomes obvious. Where the data has been evaluated "vertically" in one channel only to get a sample distribution and simple fit of the image against the theoretical figure, it now becomes necessary to evaluate the data "horizontally" across the several channels. Once again the successive data from one channel to the next should, when scanning a circular (or spherical) object, describe a truncated ellipse with the slope of the curve connecting the ends of the successive plots varying as did the successive measurements from one channel.

However, by comparing the start and end times of traces from adjoining channels, the actual deviation of the trace from the ideal figure can now be seen and, equally important, just how much of this trace should be placed above the midpoint in time mark and how much below. Actually, the channel-to-channel relationship does not need to involve time midpoints, but only the relative positions of start and end points of rise times. Thus, each multi-channel scan is a first approximation of this relationship, and this figure is constantly refined with each succeeding set of observations as the moon's image passes across the beamwidth of the scanning device.

One test of this scanning technique would be a solar or lunar eclipse. The entire device would be placed on a sidereal mount, tracking the sun and operating normal to the moon's movement across the solar disc or the earth's shadow across the lunar disc. This would give maximum changes of light intensity as the moon encroaches on the image of the solar disc or as the earth's shadow crosses the lunar surface and would possibly make for fairly sharp rise times of the photosensor traces. Also, the solar eclipse use of the technique would give an accurate measurement of the angular movement of the moon compared to the solar "movement." The data for such a back-lighted event would be foreshortened or truncated along the horizontal axis for the opposite reason it was lengthened for a foreground illuminated object.

Although the invention has been illustrated and described in terms of a preferred embodiment thereof, it will be apparent to those skilled in the art that certain changes, alternations, modifications and substitutions, particularly with respect to the construction details, can be made in the arrangement and location of the various elements without departing from the true spirit and scope of the appended claims. For example, the rotating drum scanner may be provided with more or less than the four aiming holes 19 shown in the illustrative embodiment. Also a greater or fewer number of aiming blocks 29 may be attached to the revolving drum 23 and still obtain data useful to determine the exact shape of the lunar disc.

Having thus set forth and disclosed the nature of our invention, what we claim and desire to secure by Letters Patent of the United States is:

1. A rotating drum scanner for scanning a field of view with a luminous object therein comprising a rotatable drum mounted for rotation about a predetermined axis, a plurality of aiming blocks axially mounted on the outer surface of said drum, said aiming blocks being equally spaced angularly around said drum and having aiming holes therein directed toward the field of view, a mirror angularly attached at the rearward portion of each of said aiming blocks to reflect the image entering said aiming holes downward toward the central axis of said rotatable drum, a corresponding plurality of fixed photosensor means within said drum optically aligned to receive the reflected image from said mirror surface, and means for rotating said rotatable scanning drum around its central axis at a constant speed while said luminous object transits the field of view, thereby exposing each of said photosensor means to the reflected image of the luminous object in the field of view for a time interval proportional to the size and shape of the luminous object as the image of said object comes into and goes out of optical alignment with each of the aiming holes in each of said aiming blocks.

2. The rotating drum scanner defined in claim 1 wherein the means for rotating said rotatable scanning drum around its central axis includes a motor driven drive wheel and a disc in axial alignment with said scanning drum, said drive wheel having a friction surface thereon in contact with the peripheral surface of said disc.

3. The rotating drum scanner defined in claim 1 wherein lens means are interposed in the image optical path between said mirror and said photosensor means, said lens means serving to increase the resolution of the image that impinges on said photosensor means.

References Cited

UNITED STATES PATENTS

| | | | |
|---|---|---|---|
| 2,818,172 | 12/1957 | Mills | 250—233 X |
| 3,324,274 | 6/1967 | Ives | 250—233 X |

ROBERT SEGAL, Primary Examiner

U.S. Cl. X.R.

250—233